J. P. KARNS.
DRILLING MACHINE.
APPLICATION FILED MAY 25, 1909.

1,023,654.

Patented Apr. 16, 1912.
6 SHEETS—SHEET 1.

J. P. KARNS.
DRILLING MACHINE.
APPLICATION FILED MAY 25, 1909.

1,023,654.

Patented Apr. 16, 1912.

Witnesses

Inventor
John P. Karns.
By C. A. Snow & Co.
Attorneys

J. P. KARNS.
DRILLING MACHINE.
APPLICATION FILED MAY 25, 1909.

1,023,654.

Patented Apr. 16, 1912.
6 SHEETS—SHEET 6.

Witnesses

Inventor
John P. Karns.
By C. A. Snow & Co.
Attorneys

UNITED STATES PATENT OFFICE.

JOHN PRUE KARNS, OF BOULDER, COLORADO, ASSIGNOR TO J. P. KARNS TUNNELING MACHINE CO., OF BOULDER, COLORADO.

DRILLING-MACHINE.

1,023,654.  Specification of Letters Patent.  Patented Apr. 16, 1912.

Application filed May 25, 1909. Serial No. 498,246.

*To all whom it may concern:*

Be it known that I, JOHN PRUE KARNS, a citizen of the United States, residing at Boulder, in the county of Boulder and State of Colorado, have invented a new and useful Drilling-Machine, of which the following is a specification.

This invention has reference to improvements in drilling machines particularly adapted for use in drilling tunnels, drifts, air-shafts, and the like.

The present invention is an improvement on the structure shown and described in Letters Patent #892,849 granted on July 7, 1908, on an application filed by me for improvements in drilling machines. In the structure shown in the said Letters Patent there is disclosed a drilling head capable of reciprocatory and rotary motion and designed to continuously drill a bore the full size of the desired tunnel. Reciprocatory motion is given to the head through a suitable shaft from a suitable source of power and the reciprocatory movement of the shaft causes a slow step by step rotative movement of the cutter head so that the cutters thereon act continuously on fresh surfaces. In the structure shown in the said Letters Patent means are provided for sustaining and centering the shaft with the cutter heads thereon and for permitting the forward feeding of the device as occasion requires.

The present invention deals with a drilling machine of the same general character as that set forth in the said Letters Patent and its object is to improve the structure of the aforesaid machine in numerous particulars and to provide several novel features not found in the machine disclosed in the said Letters Patent.

In the structure of the present invention the wheel base of the supporting truck or carriage is materially elongated over that shown in the said Letters Patent and the center of gravity of the reciprocating parts is carried well back of the forward end of the truck or carriage thus avoiding the necessity of counter-weights to balance the weight of the drill head and other parts and materially improving the steadiness of the machine. This permits the omission of the forward set of bracing struts and the use of but one strut at the rear end of the truck or carriage for centering the machine.

The present invention presents improved constructions in the shaft bearings on the carriage or truck and an improved means for causing the step by step rotative movement of the shaft, and the present invention also presents features not found at all in the construction disclosed in the said Letters Patent, including the manner of coupling the drill head shaft to the power connection; in adjusting the supporting wheels of the carriage or truck individually with relation to said carriage or truck; in the means for actuating the centering strut; in providing a buffer for the return stroke of the reciprocating parts, and in other particulars.

The invention will be best understood from a consideration of the following detail description taken in connection with the accompanying drawings forming a part of this specification, in which drawings.

Referring to the drawings there is shown a casting 1 constituting the body of the carriage or truck, substantially semi-circular in cross section and of general web construction. The carriage is provided at each end with bearings for a shaft 2 carrying at one end, which for convenience will be termed the front end, a drill head 3, the construction of which latter will not be described in any detail since the said drill head forms the subject matter of another application Serial No. 498,244, filed May 25, 1909, for cutter head for tunneling machines, and, so far as the present invention is concerned, this drill head may be substantially the same as that described in the aforesaid patent.

It may be stated that the drill head 3 is of heavy construction adapted to resist the action of the blows delivered against the breast of the tunnel being drilled and the whole structure of the drill head, carriage, shaft and supporting parts is massive and is designed to deliver heavy blows which will rapidly disintegrate rock formation so that the action of the machine as a whole is relatively rapid.

The reciprocating parts of the machine are made very heavy so that advantage may be taken of the inertia of these reciprocating parts for causing a powerful impact blow on the breast of the tunnel.

The supporting parts for the shaft and drill head are constructed not only with reference to strength and durability but also with reference to accessibility for inspection, care, and repair.

The carriage 1 is formed with a casing for the shaft at each end of said carriage. At the forward end of the carriage there are formed three parallel spaced and inwardly directed ribs 4, 5, 6, rising slightly from the bed of the carriage and conforming to the general semi-circular shape thereof. Each rib is formed along its inner face with a ball race 7 in the form of a groove.

The ribs 4, 5, 6, constitute the lower member of a journal casing, the upper member 8 of which is a semi-cylindrical casting having inwardly directed radial spaced ribs 9, 10, 11, matching the ribs 4, 5, 6, and each provided with a ball race 12 like the ball race 7 of the matching race. The joining web of the journal cap 8 between the ribs 9, 10, 11, has its counterpart in the rounded sides of the carriage body 1 between the ribs 4, 5, 6, so that this portion of the carriage when the cap member 8 is in place constitutes a cylindrical journal casing. The meeting edges of the carriage 1 and the cap member 8 are formed with lateral flanges 13 and 14 respectively and are formed with respective grooves 15 and tongues 16, holding the two members in true cylindrical arrangement. Suitable bolts 17 extending through the flanges serve to secure the parts together in removable relation.

Along one side of the carriage 1 and projecting from the flange 13 are ears 18 and formed on the corresponding side of the cap member 8 are matching ears 19 and these ears are connected by a pivot pin 20 so that by removing the bolts 17 the cap member 8 may be turned about the pivot pin 20 as a hinge and thereby expose the interior of the journal casing for ready access thereto and avoiding the necessity of lifting the cap member 8 bodily from the base member on the journal casing, this being particularly advantageous in structures of this character, especially when such access is desirable or necessary while the machine is within a tunnel.

The ribs 4 and 6 and also the ribs 9 and 11 are formed on their laterally outer faces with inwardly directed flanges 21 and housed within the journal casing and held against longitudinal movement therein is a cylinder 22 formed on its outer surface with circumferential ribs 23, these ribs matching the ribs 4 and 9, 5 and 10, 6 and 11 respectively and each of the ribs 23 being formed with a ball race 24 matching the ball races 7 and 12. The cylinder 22 is supported within the journal casing by series of anti-friction balls 25 lodged in the respective ball races. Access to these ball races is had through suitable passages 26 in the cap member 8 coincident with the ball races and each passage 26 is normally closed by a screw plug 27, this arrangement facilitating the introduction of the balls into the ball races and preventing accidental escape of the balls therefrom. The cylinder 22 is thus prevented from longitudinal movement both by the flanges 21 and the balls 25 but may turn freely within the journal casing because of the anti-friction support furnished by the series of balls 25.

The inner wall of the cylinder 22 is formed with a circular series of equally spaced longitudinal grooves 28 extending throughout the length of the inner wall of the cylinder and open at the ends thereof, these grooves being also of equal depth throughout and each curved in cross section on the same radius. The ends of the cylinder 22 carry rings 29 closing the ends of the grooves 28 and held to the cylinder in a manner hereinafter described with reference to the showing of other figures and particularly to that of Fig. 5.

The drill head 3 is provided with an extended hub 30 formed adjacent to the rear face of the drill head with a shoulder 31 and from the shoulder to the rear end of the hub the latter is of reduced diameter. The hub 30 receives the front end of the shaft 2 which is of a suitable diameter to snugly fit into the hub and this shaft extends to a point within the drill head 3. The shaft 2 near the front end is formed with a diametric slot 32 and matching slots are formed through the walls of the hub 30 as indicated at 33. The hub and shaft are secured firmly together by a wedge key 34 having its narrow end formed with a threaded stem 35 to which is applied a nut 36 held in adjusted positions by a nut lock 37. The key 34 is also held in place by a strap 38 passed over its wider end and held in the same manner as another strap for a like purpose at the other end of the shaft and which will be described hereinafter with reference to Fig. 2.

The rear end of the reduced portion of the hub 30 abuts against an annular flange 39 formed on the shaft 2 and between the annular flange 39 and the shoulder 31 the reduced portion of the hub 30 carries a sleeve 40 which may be secured to the hub 30 by being shrunk thereon. The outer surface of the sleeve 40 is provided with a circular series of longitudinal grooves 41 matching the grooves 28 in the cylinder 22 and in cross section these grooves are curved on the same radius as the grooves 28. The grooves 41 extend from end to end of the sleeve 40. Seated in the matching grooves 28 and 41 are balls 42 holding the cylinder 22 and sleeve 40 in concentric but spaced relation so that there is an annular space between the adjacent surfaces of the cylinder and sleeve. The space between the outer surface of the sleeve 41 and the inner surface of the cylinder 22 is sufficient for the introduction of a cylindrical ball cage 43 maintaining the balls 42 in spaced relation and it is shorter than either the sleeve 42 or cylinder 22 so that the sleeve 40 may travel longitudinally with relation to the cylinder 22 without interference for a purpose which will presently appear.

By the construction described extensive anti-friction bearings are provided for both the longitudinal and the rotary motion of the shaft and this is advantageous because of the massiveness of the structure.

The annular flange 39 on the shaft 2 is flattened on opposite sides as indicated at 44 and the reduced portion of the hub 30 is provided with oppositely disposed wings or continuations 45 with the facing portions parallel and adapted to receive the flat portions 44 of the flange 39. The sleeve 40 is provided with like wings or extensions 46 exterior to the wings 45 and flattened at the facing ends so as to engage the flat portions 44 of the flange 39. When the parts are assembled the flat portions 44 of the flange 39 will fit in between the facing portions of the wings 45 and 46 so that the slot 32 is brought into alinement with the slots 33 in the hub 30. Furthermore, the wings 45 and 46 serve to prevent the shaft 2 from turning in the hub 30 and so the key 34 is relieved from any shearing action which might be present if the key were relied upon to prevent the turning of the shaft in the hub or the turning of the cutter head on the shaft.

At the other or rear end of the carriage 1 there is formed another journal bearing for the shaft 2 and this journal bearing is of less bulky structure than the one at the front end of the carriage since the main portion of the weight of the movable part of the drilling machine is sustained by the front bearing, the central line of gravity of the reciprocating parts being located about at the rear end of the front bearing.

The carriage body 1 at the rear end is formed with two spaced ribs 47, 48, like the ribs 4 and 6 of the front journal bearing, and these ribs are curved in conformity with the curvature of the side walls of the carriage body 1. These ribs are provided with ball races 49 and side flanges 50 like the ribs 4 and 6. The top of the rear journal casing is formed of a cap member 51 having inwardly directed ribs 52, 53, corresponding to the ribs 9 and 11 of the cap member 8 and these ribs are provided with ball races 54 and end flanges 55 like the ball races and flanges of the ribs 9 and 11.

Figure 1:
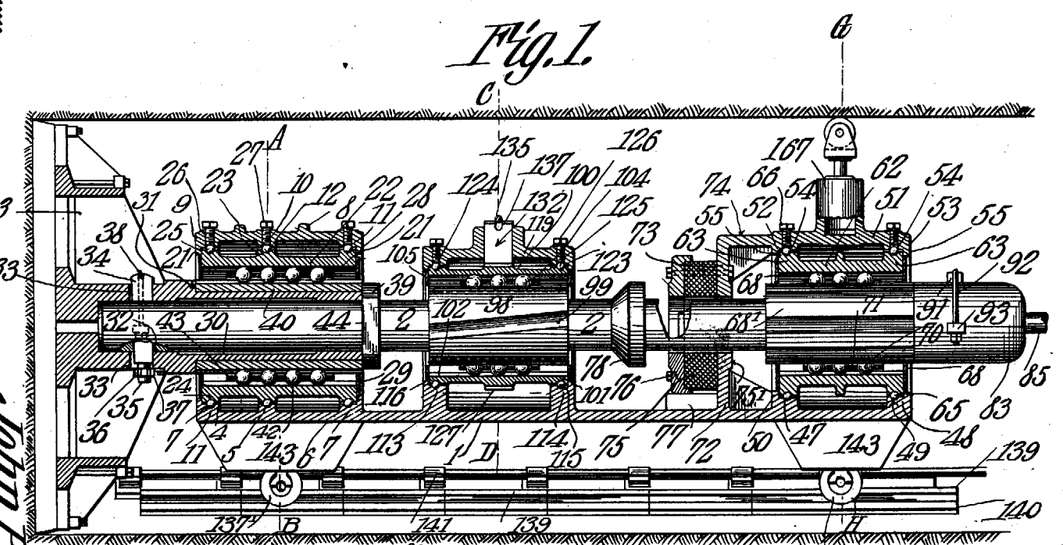
Figure 1 is a longitudinal central vertical section through a machine constructed in accordance with the present invention, some of the parts being shown in elevation.
Figure 2:
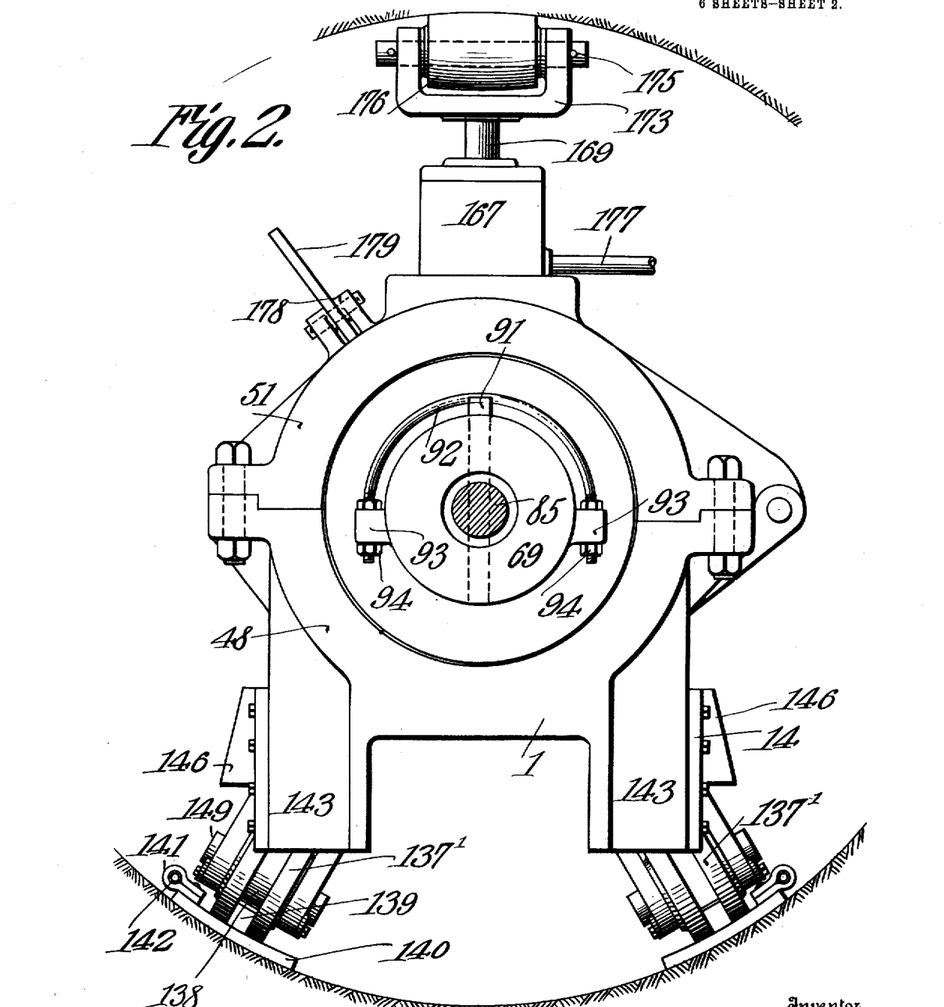
Fig. 2 is an elevation of the end of the machine remote from the drilling head, with the connecting member between the power shaft and the source of power shown in section and with the drill head omitted.
Figure 3:
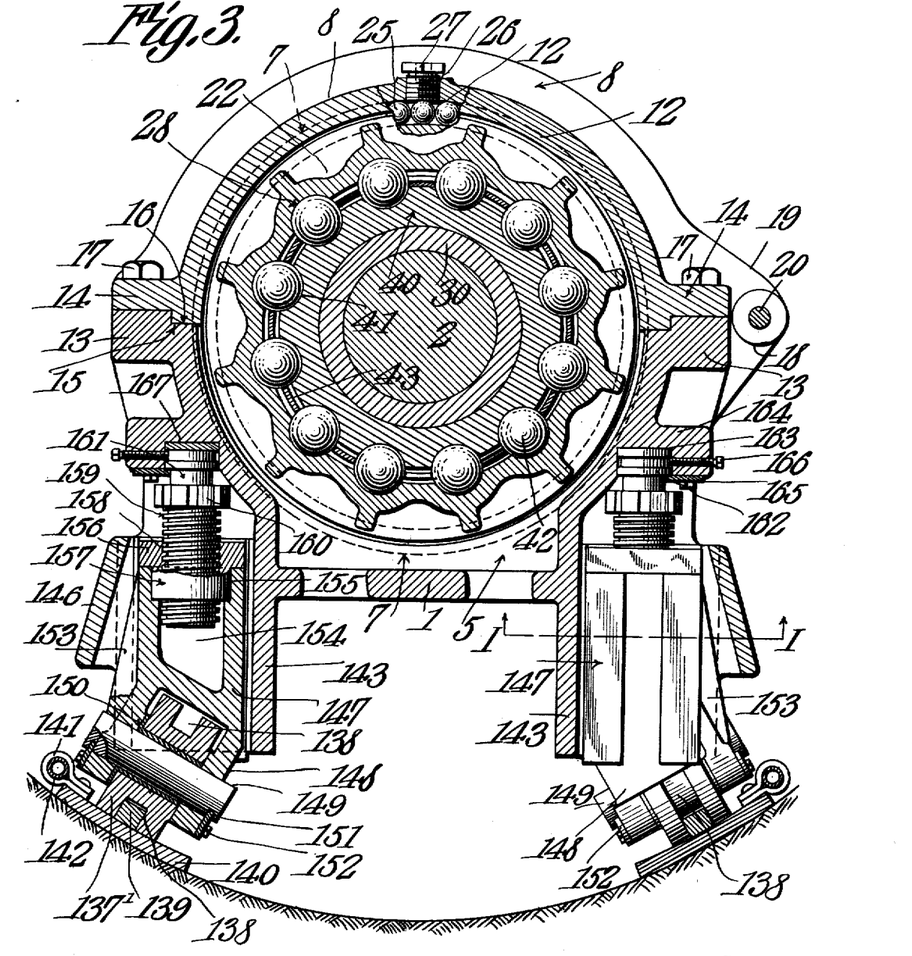
Fig. 3 is a section on the line A—B of Fig. 1 with parts shown in elevation.
Figures 6, 7:
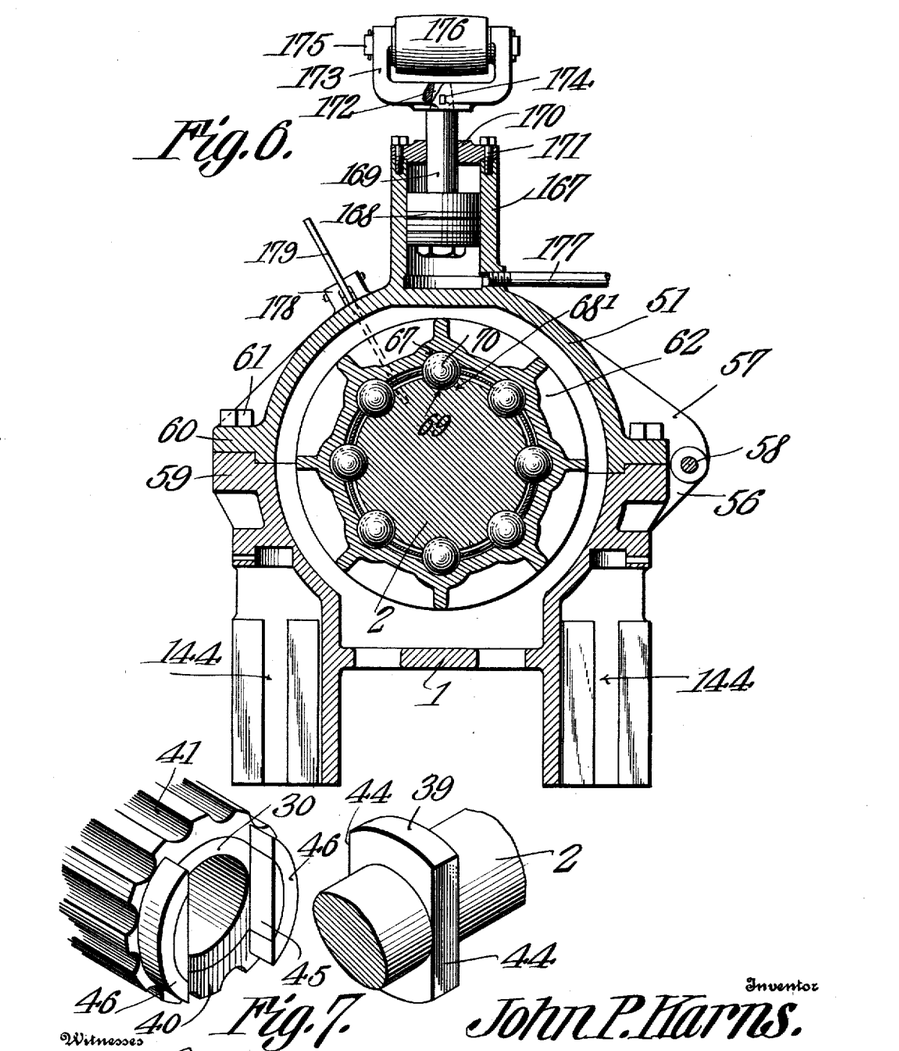
Fig. 6 is a section on the line G—H of Fig. 1 with parts omitted.
Fig. 7 is a displayed perspective of a portion of the cutter head shaft and of a bearing sleeve applied thereto.
Figure 8:
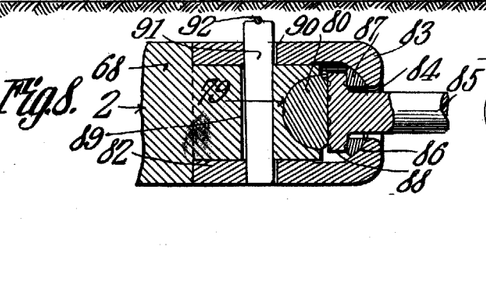
Fig. 8 is a longitudinal central section of the portion of the cutter head shaft shown at the right-hand end of Fig. 1.
Figures 9, 10, 11:
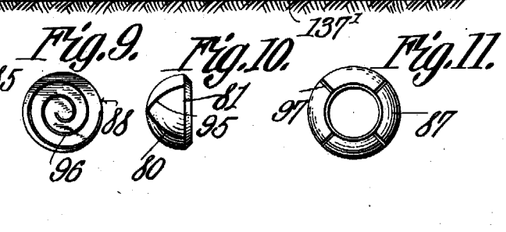
Figs. 9, 10 and 11 are detail views of portions of the structure shown in Fig. 8.
Figure 12:
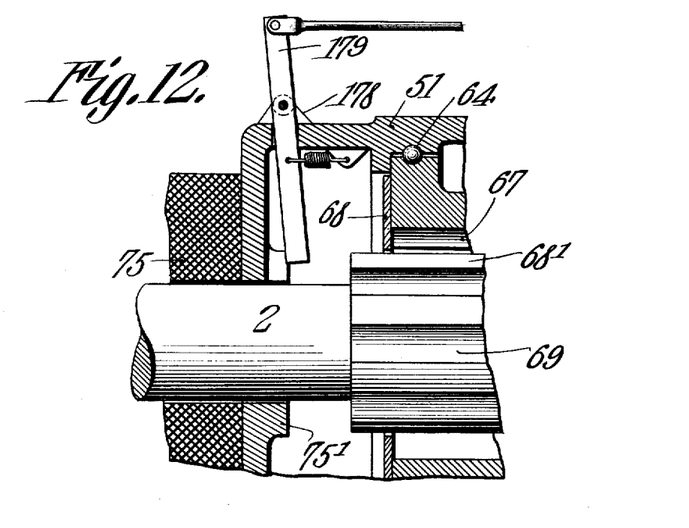
Fig. 12 is a detail view showing the signal lever.
Figures 13, 14:
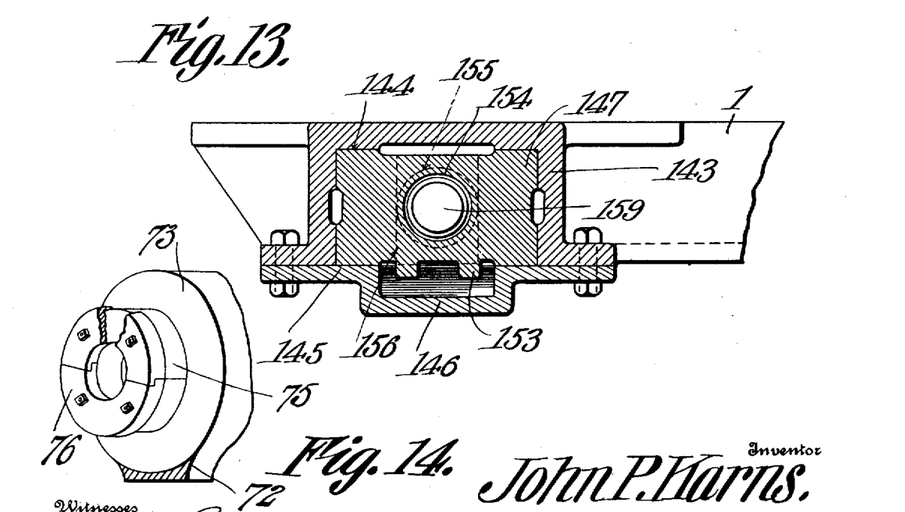
Fig. 13 is a cross section of one of the supporting legs, on the line 1—1 of Fig. 3.
Fig. 14 is a perspective view of the buffer structure.

The rear journal bearing is best shown in Figs. 2 and 6 taken in connection with Fig. 1. It will be observed that the lower member of the journal casing formed on the carriage 1 and also the cap member 51 are formed with ears 56 and 57 respectively on one side at the meeting edges and these ears are connected by a pivot rod or pin 58 so that the cap member 51 is hinged to the lower member of the journal casing as is the case with the journal casing at the front of the carriage. The meeting edges of the two members of the journal casing are provided with longitudinal flanges 59 and 60 respectively, and these flanges receive bolts 61 for securing the cap member and lower member of the journal casing together.

Within the rear journal casing is housed a cylinder 62 like the cylinder 22 and formed on the outer surface at the ends with circumferential radially extending ribs 63, like the ribs 23 on the cylinder 22. The ribs 63 match the ribs 52 and 53 of the cap member 51 and the ribs 47 and 48 of the basic member of the journal casing and are provided with ball races 64 coacting with the ball races 54 and containing series of anti-friction balls 65. The ball races in the cap member 51 have passages leading thereto normally closed by screw plugs 66 like the screw plugs 27.

Figure 5:
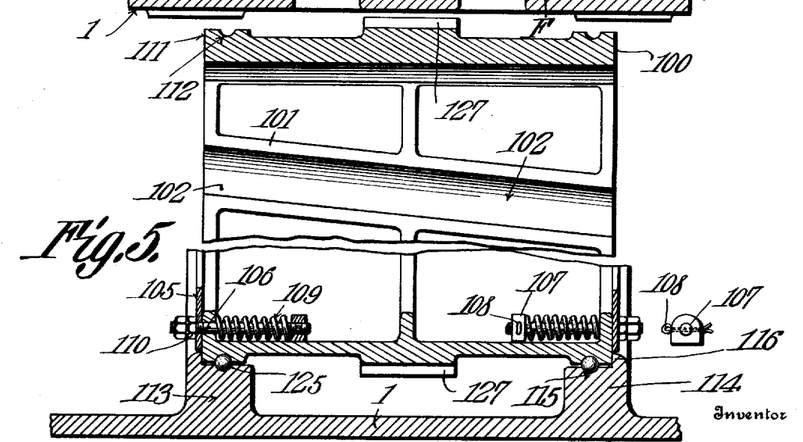
Fig. 5 is a section on the line E—F of Fig. 4 with parts omitted.

Formed on the inner face of the cylinder 24 is a circular series of equally spaced longitudinal grooves 67 extending from end to end of the cylinder and closed at the ends by rings 68 held in place elastically by means such as described with reference to the showing of Fig. 5 hereinafter.

That portion of the shaft 2 extending through the cylinder 62 is increased in diameter as indicated at 68' and the exterior surface of the portion 68' of the shaft is formed with a circular series of equally spaced longitudinal grooves 69 matching the grooves formed on the inner face of the cylinder 62. These grooves receives series of balls 70 and the cross sectional curvature of the grooves is such that the balls hold the inner surface of the cylinder 62 away from the outer surface of the enlargement 68' of the shaft 2 so as to form an annular space between them in which space there is lodged a cage 71 maintaining the balls 70 in proper spaced relation and this cage is shorter than the length of either the cylinder 62 or the shaft enlargement 68' so that the balls may move longitudinally along either the enlargement or the cylinder as the case may be. The balls however cannot escape from the grooves because of the rings 68.

Formed on the carriage 1 in spaced relation to the rib 47 and disposed away from the same toward the front of the machine is a web 72 radial to the axis of the shaft 2 and partially embracing the same. Formed on the cap member 51 is a matching web 73 spaced from said cap member by a continuation 74 of the cylindrical portion of said cap member 51. The webs 72 and 73 surround the shaft 2 and constitute a wall spaced away from the front end of the portion of the cap member 51 inclosing the cylinder 62 a distance little more than half the total extent of travel of the shaft 2 on its longitudinal axis along the carriage 1.

Surrounding the shaft 2 immediately in front of the wall made up of the webs 72 and 73 is a buffer ring 75 either made of rubber or otherwise rendered elastic and if of rubber this ring is spaced with a plate 76 having a central opening for the passage of the shaft 2. The plate 76 is supported on a boss 77 formed on the carriage body 1 adjacent to the web 72. The plate 76 and buffer 75 may be secured to the structure in any suitable manner so that the shaft may pass freely therethrough. By dividing the ring 76 and buffer block 75 in two parts the said parts may be secured to the web 72 and the web 73 respectively so that the cap plate 51 may be turned upon its hinges when desired carrying the web 73 with the portion of the buffer structure secured thereto with it, thus avoiding the necessity of unfastening the buffer structure when it is desired to gain access to the interior of the journal casing.

Formed on the shaft 2 in front of the buffer is an annular head 78 having the face adjacent to the corresponding face of the plate 76 parallel therewith so as to engage the buffer when the shaft is moved longitudinally toward said buffer.

The inner faces of the webs 72 and 73 are formed with bosses surrounding the opening formed for the passage of the shaft 2, and these bosses together form a non-elastic bumper 75' in the path of the enlargement 68' on the forward or active stroke of the shaft. Under normal conditions the cutter head will contact with the breast of the tunnel before the enlargement 68' contacts with the bumper 75'. However, should the operator fail to advance the machine to the breast of the tunnel it will be noted that this bumper 75' will limit the forward movement of the shaft thus preventing the shaft to be so far advanced as to permit the piston of the engine which reciprocates the shaft from taking out the front heads of the cylinders. On the back stroke the elastic buffer 75 through its contact with the boss 78 will prevent the shaft from forcing the pistons back to an extent which would injure the rear heads of the engine cylinders.

To the rear of the enlargement 68 the shaft 2 is reduced to its normal diameter and terminates at a short distance to the rear of the enlargement $68^1$, being formed at its rear end with a semi-spherical recess 79 having fitted thereinto a semi-spherical block 80, preferably of bronze and provided with a short frusto-conical extension 81, the said block 80 constituting a bearing ball having a seat in the semi-spherical recess 79.

Surrounding the rear extension of the shaft is a sleeve 82 extending from the enlargement 68' to a point beyond the rear end of the rear extension of the shaft and there inturned to form a circular ledge 83 the inner edge of which forms the walls of an axial passage 84 through which extends a connecting member 85 in the form of a round bar coming from a suitable actuating mechanism capable of imparting reciprocating motion to the bar 85 but which forms no part of the present invention and is therefore not shown in the drawings. An electric, compressed air, or other suitable engine may be used for the purpose. The inner wall of the inwardly directed flange 83 is formed with a curved seat 86 for a ring bearing 87 having one wall plane and the other wall curved into conformity with the curvature of the seat 86. Lodged between the outer face of the frusto-conical extension of the ball 80 and the plane face of the bearing ring 87 is a cylindrical head 88 formed on the end of the rod 85 and having parallel plane faces engaging respectively the plane face of the bearing ring 87 and the outer plane face of the frusto-conical extension of the ball 80, the sleeve 82 being somewhat enlarged internally at this point to form a chamber between the inner wall of the flange 83 and the outer end of the shaft 2 for the accommodation of the head 88 and the bearing members embracing the same.

Extending through the rear portion of the shaft 2 at a point somewhat in front of the socket 79 is a diametric slot 89 matching similar slots 90 in the wall of the sleeve 82 and extending through these slots is a taper key 91 having its wider end formed with a recess for the reception of a bar or rod 92 having its ends threaded and extending through ears 93 formed on opposite sides of the sleeve 82 and there receiving nuts 94, the middle portion of the rod engaging the key 91 and holding the same in place. Preferably two nuts 94 are applied to each end of the rod 92 so that one nut will lock the other in place against accidental displacement. The rod 38 before referred to and the rod 92 are practically the same as to shape, function, and mode of attachment.

Since there is considerable relative motion between the end of the shaft 2, the ball 80, the head 88, the ring 87 and the seat 86, the ball 80 may be provided with lubricant directing grooves 95, the head 88 on its contacting faces with lubricant directing grooves 96, and the bearing ring 87 on its engaging faces with lubricant directing grooves 97. The chamber housing the head 88 and adjacent parts will operate as a lubricant reservoir. It will be observed that the curvature of the socket 79 and of the bearing 86 are from the same center, the connection between the rod 85 and the shaft 2 being therefore in the nature of a ball and socket joint.

Between the flange 39 and the head 78 the shaft is formed with another cylindrical enlargement 98 and in the outer surface of this enlargement are formed longitudinal grooves 99 slightly pitched with relation to the longitudinal axis of the shaft 2, the pitch or inclination of these grooves in the direction of their lengths being only about the width of one of the grooves. In practice a pitch of five degrees for the grooves 99 is found sufficient, but the pitch of these grooves may be varied in accordance with circumstances and in accordance with the size and weight of the machine.

The enlargement 98 is inclosed by a cylinder 100 which may be of web construction with interior webs or flanges 101 shaped to form longitudinal grooves 102 matching and pitched to the same degree as the grooves 99. Within the matching grooves 99 and 102 are lodged balls 103, the cross sectional curve of the grooves and the diameter of the balls and also the diameters of the enlargement 98 and the cylinder 100 being so related that there is an annular space between the outer surface of the enlargement 98 and the inner edges of the webs of the cylinder 100, this space being provided for a ball cage 104 holding and spacing the balls, but this ball cage is of less length than the length of the enlargement 98 and cylinder 100.

The ends of the grooves 102 are closed by rings 105 held in place by bolts 106 passing through the rings and through the end webs of the cylinder 101. The inner ends of the bolts 106 have nuts 107 applied thereto and these nuts are elongated on one side to engage the inner face of the cylinder 100 so as to prevent the bolts from turning, the said nuts being secured to the bolts by cotter pins 108 or other suitable means.

Between the nut 107 and the inner face of the corresponding end web of the cylinder 100 each nut is surrounded by a spring 109 and exterior to the ring 105 each bolt is provided with nuts 110, two nuts being provided so that one nut will act as a lock nut for the other. The bolt 106 with the spring 109 holds the plate 105 elastically so that a blow directed against the inner face of a ring will cause the same to move slightly outward, the rings thus acting as yielding retainers for the balls.

The rings 29 and 68 of the front and rear bearings respectively are held in place in the same manner, that is with spring held bolts similar to the bolts 106.

At the ends of the cylinder 100 on the exterior thereof are circumferential ribs 111 provided with ball races 112 and the carriage body 1 is provided with spaced ribs 113, 114, similar to the ribs 4 and 6 of the front journal casing. These ribs are provided with ball races 115 and with end flanges 116. The carriage body 1 between the ribs 113 and 114 at the upper edge on one side is provided with ears 117 and along both edges with lateral flanges 118. This portion of the carriage 1 is provided with a cap member 119 provided with ears 120 matching the ears 117 and connected thereto by a hinge rod or bolt 121 so that the cap member may be turned back out of the way about the hinge rod 121. Bolts 122 serve to secure the cap member to the base member of the casing surrounding the cylinder 100. On the inner face of the cap member 119 there are formed inwardly directed ribs 123 matching the ribs 113 and 114 and provided with ball races 124 matching the ball races in the cylinder 100. These ball races are filled with suitable anti-friction balls 125 and access to the ball races is had through suitable passages in the cap member 119 normally closed by screw plugs 126.

Extending about the middle portion of the cylinder 1 and projecting radially outward therefrom are ratchet teeth 127 arranged in a continuous series and all having their abrupt shoulders located on the like sides of all the teeth. The ratchet teeth 127 are quite wide in the direction of the longitudinal axis of the cylinder 100 so that numerous teeth may be employed without sacrifice of strength.

For a distance circumferentially about the cap member 19 the walls thereof are doubled as indicated at 128 and these walls are joined by radial webs 129 so that the walls inclose a series of chambers 130 arranged circumferentially. The outer and inner walls of these chambers are pierced by radial slots 131 in line one with the other and extending in the direction of the longitudinal axis of the shaft 2 to agree with the width of the ratchet teeth 127. The slots 131 are provided for the passage of gravity pawls 132 snugly but freely fitting the slots 131 and having their inner ends shaped to engage the ratchet teeth 127. The pawls are undercut on each face near the outer ends as indicated at 133 to facilitate handling. The double wall section 128 of the cap member 119 affords ample support for the pawls while the chambers 130 reduce the area of sliding contact between the pawls and their supports thus causing the pawls to respond more freely than though they were in frictional contact along their entire length with the walls of the guide-ways.

At suitable points along the radially extended portion 128 are ears 134 receiving a rod 135 held in place by nuts 136 and this rod engages in recesses 137 formed in the outer ends of the pawls 132, the rod 135 thus operating as a retaining member for the pawls but at the same time permitting movement of the pawls sufficient to clear the ratchet teeth 127 as needed.

In the drawings there are shown nine pawls 132 equi-distantly disposed and all radial to the axis of the shaft 2, but this number of pawls is by no means mandatory and may be made greater or smaller as desired. The number of teeth may be proportional to the number of pawls 132 and the arrangement usually employed is to have the number of pawls and the number of ratchet teeth so related that but one ratchet tooth is in engagement actively with a pawl at any one time while the relation of the pawls to the teeth is such that these pawls engage the teeth in progressive order throughout the series of pawls. Thus a rotative movement of the cylinder 100 in the proper direction need be but a small fraction of the length of a ratchet tooth to cause the engagement of a pawl with a ratchet tooth without lost motion or back lash.

The grooved enlargement 98 together with the ratchet cylinder 100 and the pawls 132 constitute a feeding mechanism for causing a rotative movement of the drill head 3 by the longitudinal reciprocation of the shaft 2.

When the shaft 2 is moved forward on its active stroke to bring the drill head 3 into engagement with the breast of the tunnel, the shaft because of its great weight and the weight of the parts carried thereby has no tendency to turn on its longitudinal axis and therefore will move straight forward. The cylinder 100 however is held by the ribs 113, 114 and 123 against participating in this forward movement of the shaft 2. The result is that there is a tendency to move the grooves 99 out of coincidence with the grooves 102, but thus is prevented by the balls 103 and therefore there is imparted to the cylinder 100 a rotative movement on its longitudinal axis commensurate with the longitudinal movement of the shaft 2 and the pitch of the grooves 99 and 102.

Figure 4:
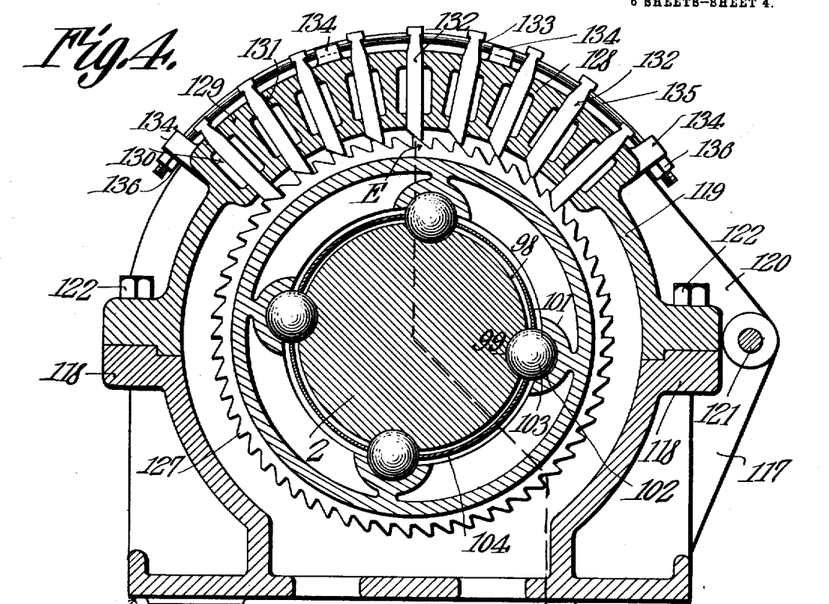
Fig. 4 is a section on the line C—D of Fig. 1 with more remote parts omitted.

To an observer viewing the structure as shown in Fig. 4 the twist or pitch of the grooves 99 and 102 is counterclockwise and consequently on the forward movement of the shaft 2 there is imparted to the cylinder 100 a clockwise movement causing the ratchet teeth 127 to ride idly under the pawl 132 to an extent commensurate with the rotative movement imparted to the cylinder 100.

In the particular instance shown where there are nine pawls and sixty ratchet teeth a rotative movement of two-thirds of a degree is the smallest active feed of the cylinder 100. When the shaft 2 is being retracted then the tendency is to rotate the cylinder 100 counter-clockwise but under these circumstances the cylinder 100 is held against movement by some one of the pawls 132 and consequently the shaft itself and parts carried thereby is given a rotative movement upon the longitudinal axis of the shaft agreeable to the initial rotative movement of the cylinder 100 so that on the next forward or active movement of the shaft the cutters carried by the drill head 3 are brought into engagement with fresh surfaces of the breast of the tunnel. The rotative movement imparted to the shaft 2 may be great or small depending upon the longitudinal movement of the shaft and the corresponding rotative movement of the cylinder 100.

The number of pawls 132 and the number of teeth 127 and the relation between these pawls and the teeth may be varied with different sizes of machines and consequently the showing of the drawings is to be taken as indicative only and not mandatory.

The shaft 2 has considerable range of longitudinal movement through the carriage body 1, it being shown in Fig. 1 at about the median point of this range of travel.

The carriage is mounted upon wheels or rollers 137′ at the ends of the carriage beneath the journal bearings thereon and because of the cylindrical shape of the bore of the tunnel these wheels are set radial to the axis of the shaft 2. Each wheel 137′ is provided with a circumferential groove 138 midway between its ends and this groove is designed to receive a guiding rib or strip 139 secured centrally and longitudinally on track plates 140 adapted to rest on the floor of the tunnel and longitudinal thereof in proper spaced relation to receive the wheels 137′ with the peripheries thereof engaging the upper face of the track 140. The guiding strip 139 is preferably made separate from the track members 140 and is bolted or riveted thereto, but it is evident that these parts may be rolled out in one piece if so desired. The tracks 140 are made in comparatively short sections and each section is provided with eyes 141 on one side so that the track sections may be joined together by rods or pipes 142 into suitable lengths. The track sections 140 are made sufficiently long and wide to form a broad bearing surface so that only four wheels 137′ are needed even for a large structure, there being two wheels at each end on opposite sides of the median line of the structure.

To support the wheels the carriage 1 is provided at opposite sides of the two ends below the journal bearings for the shaft 2 with downwardly extending legs 143 shown in Figs. 1, 2, 3 and 6. The legs 143 are parallel one with the other and are formed with guide grooves 144 extending from near the top to the bottom thereof. Each leg is provided with a cover plate 145 having a central oppositely inclined off-set 146. Housed in each leg is a hollow casting 147 shaped to engage the guide grooves 144 and having at its lower end an outwardly inclined yoke 148 normally radial to the axis of the shaft 2. The legs of the yoke are formed with passages for a pin 149 upon which is mounted a roller or wheel 137′ and this wheel may carry a bushing 150 of bronze or other suitable material. Each end of each pin 149 extends beyond the yoke 148, and is there provided with a lateral recess 151 in which is seated one edge of a plate 152 fast on the corresponding yoke arm. This plate serves to hold the pin against rotation and also against longitudinal movement.

Because of the inclined or annular position of the yoke 148 with reference to the casting 147 the yoke is connected to the casting by a strengthening rib 153 and it is to prevent interference with this strengthening rib when moving the casting 147 lengthwise of the corresponding leg 143 that the outwardly inclined portion 146 of the cover plate of the leg is provided.

The interior of the casting 147 is hollow to form a chamber 154 and the upper end of this chamber is open and counter-sunk as indicated at 155.

Resting on the upper end of the casting 147 is a plate 156 provided with a central extension 157 and through this plate 156 and extension 157 is a passage provided with internal screw threads 158, the said plate and its extension thereby constituting a nut. The nut receives the threaded end of a screw 159 of the jack screw type having near one end a circumferential flange provided with radial teeth 160 and beyond the head 160 the jack screw 159 is continued in the form of a stem 161 having formed near its free end a circumferential flange 162. The flanged end of the screw enters a socket 163 formed in a lateral boss 164 projecting from the side of the casting 1 in line with the corresponding leg 143. A plate 165 applied to the under face of the boss 164 and suitably secured thereto serves to maintain the corresponding end of the jack screw 159 in the socket 163. A set screw 166 threaded through the boss 164 may be moved into engagement with the end of the jack screw 159 within the recess 163 and thereby lock the screw against turning. The upper end of the jack screw bears against a wearing plate 167 seated in the recess 163. The space between the boss 164 and the upper end of a leg 143 is ample space for the manipulation of a wrench applied to the teeth 160 of the jack screw so that the latter may be turned as desired to cause the elevation or depression of the machine with reference to the supporting wheels. By a proper manipulation of the jack screws 159 each casting 147 with its wheel 137 may be adjusted with relation to the truck or carriage body 1 individually and thereby the whole structure may be leveled or adjusted at will with the greatest facility.

The cap member 51 of the rear journal casing of the shaft 2 is provided at its upper central portion with a cylinder 167 in which there is fitted a piston 168 on one end of a piston rod 169 extending beyond the upper end of the cylinder 167 through a cylinder head 170 fast to the upper end of the cylinder by means of suitable screws 171 and centrally bored for the passage of the piston rod 169. The upper end of the piston rod is shouldered and provided with a frusto-conical continuation 172 entering the central portion of a yoke 173 and secured thereto by a key 174. The yoke 173 carries a journal pin 175 for a roller 176 shaped to engage the roof of the tunnel. The lower end of the cylinder 167 is entered by a pipe 177 coming from a suitable source of fluid supply under pressure.

Formed on the connecting web 77 are two spaced parallel ears 178 and journaled in these ears is a bar or lever 179 entering the chamber formed between the webs 72 and 73 and the corresponding end of the rear journal bearing and the inner end of this lever is in the path of the enlargement 68′ of the shaft 2.

The general operation of the structure described is the same as that set forth with reference to the structure shown in the aforesaid Letters Patent. The drill head 3 is adjusted to the breast of the tunnel being bored with the carriage 1 in proper relation to the said drill head and shaft 2. The drill head and shaft are properly leveled or otherwise adjusted by a suitable manipulation of the jack screws 159 and fluid under pressure is introduced into the cylinder 167 thus moving the roller 176 into such forcible engagement with the roof of the tunnel as may be desired.

On the inner faces of the webs 72 and 73 are formed bosses surrounding the opening formed for the passage of the shaft 2, and these bosses together form a bumper 75' in the path of the enlargement 68' on the forward or active stroke of the shaft. The inner walls of the webs 72 and 73 are reinforced by strengthening ribs or otherwise.

The buffer 75 receives the back stroke of the machine and by the power thus stored assists in the forward stroke; it also prevents the piston striking the back end of the cylinders of the engine should there be insufficient cushioning in the driving engine.

The bumper 75' is designed to receive the forward stroke of the machine should the operator fail to properly feed the machine and the cutter head therefore fail to strike the breast of the tunnel. This will prevent such a long forward stroke of the machine as to bring the piston of the operating engine against the front cylinder head and thereby either injuring or actually driving the cylinder head out.

The lever 179 is engaged by the enlargement 68' of the shaft 2 before it engages the bumper and so transmits a signal to the operator indicating where the stroke is and whether or not he is feeding the machine sufficiently.

The single strut at the rear bearing of the machine and the universal connection between the drive shaft and the shaft 2 compensate for lack of alinement between the main shaft 2 and the drive shaft 85 so that it is unnecessary to set the driving engine with its piston in perfect alinement with the main shaft 2 for should it happen that the engine piston and the main shaft are somewhat out of alinement the operation of the machine will not be affected. The universal connection also permits the operation of the machine at a slight angle to the engine so that a gradual turn may be formed in the tunnel.

What is claimed is:—

1. In a drilling machine, a drill head provided with an elongated hub, a power shaft entering said hub and carrying the drill head, a bearing sleeve carried by said hub exterior thereto, and journal bearings for said sleeve.

2. In a drilling machine, a reciprocatory drill head provided with an elongated hub, a bearing sleeve carried by the hub exterior thereto, and journal bearings surrounding said sleeve and in which the sleeve is axially and rotatably movable.

3. In a drilling machine, a drill head provided with an elongated hub, journal bearings exterior to and supporting said hub and in which the hub is axially and rotatably movable, and a power shaft entering and secured to the hub for imparting rotative and reciprocatory movement to the drill head.

4. In a drilling machine, a drill head provided with a hub elongated in the direction remote from the active face of the drill head, a sleeve carried by the hub, a rotatable cylinder surrounding the sleeve, connections between the sleeve and cylinder permitting the sleeve to move axially in the cylinder, but constraining the cylinder and sleeve to rotate about the longitudinal axis of the sleeve simultaneously, and a support for the cylinder in which the latter is rotatable and by which the cylinder is held against movement in the direction of the longitudinal axis of the sleeve.

5. In a drilling machine, a drill head provided with an elongated hub terminating at the free end in opposed wings or extensions, a sleeve carried by and exterior to the hub, a shaft entering the hub and provided with a circumferential flange with opposite flat sides adapted to enter between the wings or extensions of the hub and sleeve, and a journal bearing exterior to the sleeve and in which the sleeve, hub and shaft are rotatively and longitudinally movable.

6. In a drilling machine, a drill head having an elongated hub, a shaft entering the hub and connected thereto and provided to the rear of the portion entering the hub with cylindrical enlargements provided with longitudinally disposed grooves, a forward journal bearing exterior to the elongated hub of the drill head, a rear journal bearing surrounding and coacting with the rearmost grooved enlargement of the shaft, means coacting with the intermediate grooved enlargement of the shaft for imparting rotative movement to the shaft, and a truck or carriage carrying the journal bearing and the means coacting with the intermediate enlargement on the shaft.

7. In a drilling machine, a drill head, a shaft carrying the same and capable of longitudinal movement, and provided at an intermediate point with a head or enlargement, a truck or carriage having journal bearings for the shaft at the ends of the carriage, and an elastic buffer mounted on the carriage in front of and in spaced relation to the rear bearing and in the path of the head or enlargement on the shaft.

8. In a drilling machine, a drill head, a shaft carrying the same, a carriage carrying the shaft and drill head, and under supports for the carriage comprising guides formed on the carriage on either side of and in parallel relation to the central vertical plane of the carriage, and independent supports in the guides movable therein in parallel relation one to the other, said supports terminating in rollers radially disposed with relation to the longitudinal axis of the drilling machine.

9. In a drilling machine, a drill head, a shaft carrying the same, a truck carrying the shaft and drill head, and supports for the end of the truck remote from the drill head comprising radially disposed rollers individually adjustable in planes parallel one to the other, and a thrust member above the truck and adjustable in a plane intermediate of and parallel with the planes of adjustment of the rollers.

10. In a drilling machine, a drill head, a shaft carrying the same, a journal bearing for the shaft formed of two members one of which is hinged to the other and a buffer for the shaft having a part carried by the hinged member of the journal bearing.

11. In a drilling machine, a drill head, a shaft carrying the same, and a truck or carriage having a body portion provided with journal bearings for the shaft and with substantially parallel legs, sliding members mounted in the legs and each having an angle extension, a wheel or roller carried by the angle extension, and means for adjusting the sliding blocks in the carriage legs individually, and a truck for the shaft and drill head having individually adjustable rollers for supporting the truck.

In testimony that I claim the foregoing as my own, I have hereto affixed my signature in the presence of two witnesses.

JOHN PRUE KARNS.

Witnesses:
 JOHN DAVIS,
 BOTTS STROTHER.

---

Copies of this patent may be obtained for five cents each, by addressing the "Commissioner of Patents, Washington, D. C."